(12) United States Patent
Seo et al.

(10) Patent No.: US 8,494,835 B2
(45) Date of Patent: Jul. 23, 2013

(54) POST-EDITING APPARATUS AND METHOD FOR CORRECTING TRANSLATION ERRORS

(75) Inventors: Young Ae Seo, Daejeon (KR); Chang Hyun Kim, Daejeon (KR); Seong Il Yang, Daejeon (KR); Changhao Yin, Daejeon (KR); Yun Jin, Daejeon (KR); Jinxia Huang, Daejeon (KR); Sung Kwon Choi, Daejeon (KR); Ki Young Lee, Daejeon (KR); Oh Woog Kwon, Daejeon (KR); Yoon Hyung Roh, Daejeon (KR); Eun Jin Park, Daejeon (KR); Ying Shun Wu, Daejeon (KR); Young Kil Kim, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 771 days.

(21) Appl. No.: 12/621,654

(22) Filed: Nov. 19, 2009

(65) Prior Publication Data
US 2010/0138210 A1    Jun. 3, 2010

(30) Foreign Application Priority Data

Dec. 2, 2008 (KR) .................. 10-2008-0120911
Mar. 31, 2009 (KR) .................. 10-2009-0027750

(51) Int. Cl.
G06F 17/28 (2006.01)

(52) U.S. Cl.
USPC .................................. 704/4; 704/2

(58) Field of Classification Search
USPC ............................................. 704/1–8
See application file for complete search history.

(56) References Cited

U.S. PATENT DOCUMENTS

| 7,725,408 | B2 | 5/2010 | Lee et al. | |
|---|---|---|---|---|
| 7,752,034 | B2* | 7/2010 | Brockett et al. | 704/9 |
| 2004/0102957 | A1* | 5/2004 | Levin | 704/3 |
| 2007/0143284 | A1 | 6/2007 | Lee et al. | |
| 2009/0326913 | A1* | 12/2009 | Simard et al. | 704/2 |

FOREIGN PATENT DOCUMENTS

| JP | 5-289905 | 11/1993 |
|---|---|---|
| JP | 8-339373 | 12/1996 |
| KR | 10-2001-0077041 | 8/2001 |
| KR | 10-2004-0035028 | 4/2004 |
| KR | 10-2007-0060862 | 6/2007 |
| KR | 10-2008-0069077 | 7/2008 |

OTHER PUBLICATIONS

"Rule-based Translation With Statistical Phrase-based Post-editing," Michel Simard et al., ACL 2007 Second Workshop on Statistical Machine Translation, Prague, Czech Republic, Jun. 23, 2007, pp. 203-206.

* cited by examiner

*Primary Examiner* — Samuel G Neway
(74) *Attorney, Agent, or Firm* — Staas & Halsey LLP

(57) ABSTRACT

A post-editing apparatus for correcting translation errors, includes: a translation error search unit for estimating translation errors using an error-specific language model suitable for a type of error desired to be estimated from translation result obtained using a translation system, and determining an order of correction of the translation errors; and a corrected word candidate generator for sequentially generating error-corrected word candidates for respective estimated translation errors on a basis of analysis of an original text of the translation system. The post-editing apparatus further includes a corrected word selector for selecting a final corrected word from among the error-corrected word candidates by using the error-specific language model suitable for the type of error desired to be corrected, and incorporating the final corrected word in the translation result, thus correcting the translation errors.

20 Claims, 4 Drawing Sheets

POST-EDITING APPARATUS AND METHOD FOR CORRECTING TRANSLATION ERRORS

CROSS-REFERENCE(S) TO RELATED APPLICATION(S)

The present invention claims priority of Korean Patent Applications No. 10-2008-0120911, filed on Dec. 2, 2008, and No. 10-2009-0027750, filed on Mar. 31, 2009, which are incorporated herein by reference.

FIELD OF THE INVENTION

The present invention relates to a post-editing technology for correcting translation errors of a machine translation system using language models specified for respective error types, and, more particularly, to a post-editing apparatus and method for correcting translation errors, which are suitable for the improvement of translation quality by designating priorities for error correction in conformity with the characteristics of translation errors and sequentially correcting translation errors according to the priorities using language models specified for the types of translation errors.

BACKGROUND OF THE INVENTION

The performance of a machine translation system which translates sentences of one language into another language has been continuously improving. However, such a machine translation system still makes many translation errors. In order to remove translation errors, the performance of relevant modules in a translation engine must be improved. However, this method is problematic in that, since an individual module causing corresponding error must be directly corrected, a new translation module must be implemented for error correction when the development of the translation system has already been completed. In addition, such a method is problematic in that, since error correction in individual modules does not consider whole generated sentence, there is a high probability that accurate translation is not performed and errors still remain, and in that various types of errors are not solved at once. Due to these problems, for the improvement of the performance of a machine translation system, a post-editing of translation error, capable of automatically correcting errors occurring in the final translation results by using a post-processing scheme, is useful.

Recently, many statistics-based machine translation systems have been developed, but they do not exhibit excellent performance in the case of language pairs such as the Korean-English which are quite different owing to the difference in their word order. Actually, commercialized machine translation systems are rule or pattern-based machine translation systems. One of the great characteristics of the translation results made by using the rule or pattern-based machine translation systems is that, in many cases, although the meaning of a translated sentence is correct, the translated sentence is not natural, or is awkward due to a grammatical error.

Meanwhile, a language model may be used to estimate errors of a machine translation system. Such language models are built in the form of a database (DB) of the probabilities of a sequence of specific words appearing in a large corpus. The language models are used as indices for appropriately used expressions of a target language in a statistics-based machine translation. Therefore, the language models may provide basis for automatically finding a portion in which errors have occurred by comparing a translation created by a machine translation system with the built language models and for accurately correcting that portion.

Errors of a machine translation system may be estimated using an n-gram language model which is one type of the conventional basic language models. As n is increased, much surrounding context may be viewed from the language model, but model data insufficiency may occur. Further, based on a simple n-gram model, estimation of error occurring in long-distance dependency is difficult. Moreover, since only simple arrangement of words is considered while building the n-gram language model, unnecessary word sequences, i.e., erroneous word sequences such as noise, are recognized as correct word sequences, thus decreasing accuracy in error detection and correction.

Therefore, there is a need to build a new language model for post-editing capable of handling long-distance dependency and preventing noise from occurring in the language model.

Though, one or more translation errors may coexist in one translated sentence, conventional post-editing systems for correcting translation errors does not consider the sequence of processing the coexisting translation errors. Therefore, in order to improve entire correction performance of the language model-based post-editing system, a technique primarily correcting an error having higher priority in consideration of the priorities of the coexisting errors is required.

Furthermore, the existing post-editing system is configured in a loosely-coupled structure in which it is difficult for a post-editing system to refer to information analyzed and generated by the translation engine of a translation system which performs actual translation. However, better translation performance may be achieved if errors are corrected with reference to information about an analysis of original text or a translated text by using a rule or pattern-based translation engine.

SUMMARY OF THE INVENTION

It is, therefore, an object of the present invention to provide a post-editing apparatus and method for correcting translation errors in final translation generated by a machine translation system by providing a scheme for automatically detecting the errors and for correcting the errors, thereby obtaining high quality translation result.

Another object of the present invention is to provide a post-editing apparatus and method for correcting translation errors, which designate priorities for error correction in conformity with the characteristics of translation errors of a machine translation system and sequentially correct the translation errors according the priorities by using language models specified for the types of translation errors, thus improving translation quality.

A further object of the present invention is to provide a post-editing apparatus and method for correcting translation errors, which can effectively identify mistranslation, designate priorities for correcting the mistranslation, and correct the mistranslation by using language models specified for the types of errors.

In accordance with one aspect of the present invention, there is provided a post-editing apparatus for correcting translation errors, including: a translation error search unit for estimating translation errors using an error-specific language model suitable for a type of error desired to be estimated from translation result obtained using a translation system, and determining an order of correction of the translation errors; a corrected word candidate generator for sequentially generating error-corrected word candidates for respective estimated translation errors on a basis of analysis of an original text of the translation system; and a corrected word selector for selecting a final corrected word from among the error-corrected word candidates by using the error-specific language model suitable for the type of error desired to be corrected, and incorporating the final corrected word in the translation result, thus correcting the translation errors.

In accordance with another aspect of the present invention, there is provided a post-editing method for correcting translation errors, including: estimating translation errors using an error-specific language model suitable for a type of error desired to be estimated from translation result obtained using a translation system; generating error-corrected word candidates for respective estimated translation errors on a basis of an analysis of original text by the translation system; and selecting a final corrected word from among the error-corrected word candidates using the error-specific language model suitable for the type of error desired to be corrected, and incorporating the final corrected word in the translation result, thus correcting the translation errors.

According to embodiments of the present invention, there is an advantage in that translation errors of a machine translation system such as asyntactic or unnatural expressions can be corrected in real time, thus improving the translation performance of the machine translation system.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Figure 1:
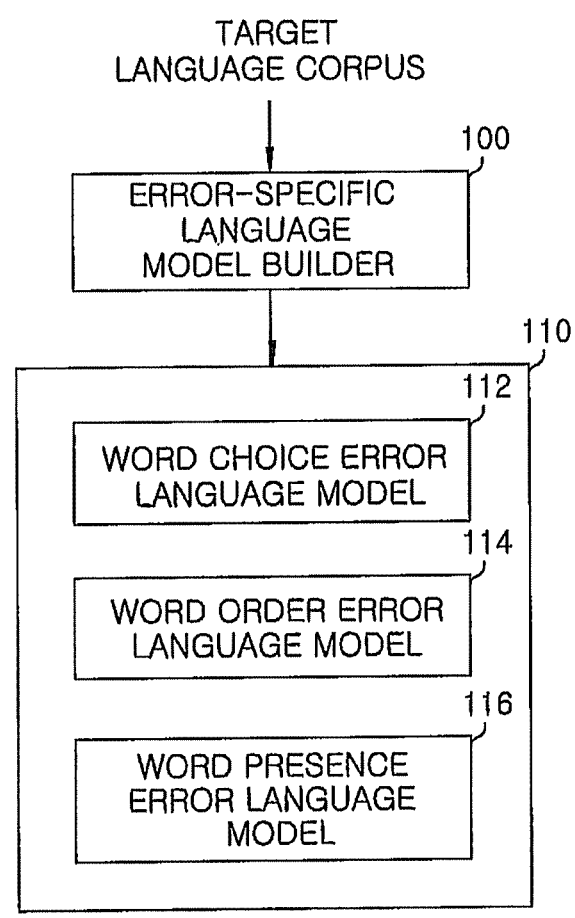
FIG. 1 is a block diagram showing the construction of an error-specific language model builder according to an embodiment of the present invention.

Hereinafter, preferred embodiments of the present invention will be described in detail with reference to the accompanying drawings. In the following description of the present invention, if detailed descriptions of related well-known constructions or functions are determined to make the gist of the present invention unclear, the detailed descriptions will be omitted. The following terms are defined considering their functions in the present invention. Since the meanings of the terms may vary according to a user's or an operator's intention or usual practice, the meanings of the terms must be interpreted based on the overall context of the present specification.

The present invention is intended to automatically detect errors in the final translation generated by a machine translation system and correct the errors to provide an accurate translation. The present invention is configured such that, after obtaining the final translation from a given data, a post-processing apparatus for correcting translation errors searches for mistranslations, designates priorities for error correction in conformity with the characteristics of the translation errors, and sequentially corrects the translation errors according to the priorities by using language models specified for the types of translation errors, thus improving translation quality.

There are various types of translation errors in the machine translation system and they may be classified using a variety of methods. Among these classification methods, when English is used as the target language, translation errors may be classified as follows:

1) Word choice error: an error in the selection of a word for translation such as a noun, a verb, an adjective, an adverb, an article, a preposition, and an auxiliary verb, an error in singular/plural agreement, and an error in determining whether singular or plural;

2) Word presence error: an error related to the presence of an article, a preposition, an auxiliary verb or adjective, and so forth; and 3) Word order error: an error in adjective sequence, the order in nominal compound, etc.

Here, word choice error refers to an error occurring in the case where the translation engine of the machine translation system generates wrong words. Word presence error refers to an error occurring in the case where words such as an article or a preposition are not present at necessary locations or are present at unnecessary locations. Word order error refers to an error occurring in the case where, when a word is modified by various adjectives or various adverbs, the order of these modifiers is incorrect, or where the order of nouns in nominal compound is incorrect.

An n-gram language model-based error correction scheme corrects errors based on whether word sequences after translation are appeared in a corpus, and the basic idea thereof is described as follows. In a Korean/English machine translation system, if an English sentence "I went to the school" is obtained as the result of translation with respect to a Korean sentence " 나는 학교에 갔다 .", less frequently appearing word sequence, equal to or less than a threshold, among the following 3-gram data, is detected as an error in a 3-gram error correction model. The following examples are simple examples of 3-gram data. The left side denotes word sequences and the right side denotes the frequencies of the respective word sequences appearing in the corpus. Actual data may have a form different from that of the examples, i.e., corrected data values rather than simple appearance frequencies.

| | |
|---|---|
| $_I_went | 200 |
| I_went_to | 100 |
| went_to_the | 120 |
| to_the_school | 15 |

The n-gram data is made based on information about the frequencies of corresponding word sequences in the corpus. However, when n-gram data is merely made based on the information about the frequencies of word sequences, there is a high probability that data will be insufficient or that inappropriate word sequences, having no meaning as n-grams, will be made.

Because of this concern, a method of extracting n-gram data using structure analysis is employed. When n-gram data is extracted from a dependency tree obtained by analyzing each dependency, there is an advantage of acquiring information about word sequences having long-distance dependency.

However, even in this case with the analyzed dependency, the language model-based post-editing method does not perform well. Therefore, a post-editing scheme for correcting translation errors, which is based on error-specific language models, is proposed in the embodiments of the present invention.

Embodiments

FIG. 1 is a conceptual diagram showing the building of an error-specific language model according to an embodiment of the present invention.

Referring to FIG. 1, an error-specific language model builder 100 receives a target language corpus as a training corpus to build a language model, thereby generating an error-specific language model 110 including a word choice error language model 112, a word order error language model 114 and a word presence error language model 116 suitable for the correction of word choice error, word order error and word presence error, respectively, through the target language corpus.

Figure 2:
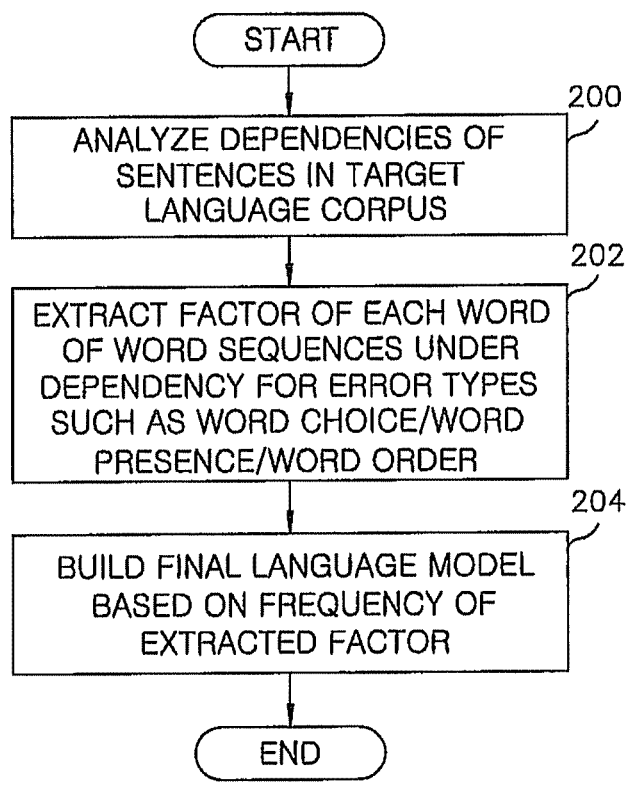
FIG. 2 is a flowchart showing a process for building an error-specific language model according to an embodiment of the present invention.

FIG. 2 is a flowchart showing a process for building an error-specific language model according to an embodiment of the present invention.

Referring to FIG. 2, after receiving a target language corpus, the error-specific language model builder 100 builds a language model in a form suitable for correcting errors, in which the language model is based on dependency grammar. In order to build language models suitable for respective error types, the language models are built by defining factors required for the correction of relevant errors for the respective error types. Accordingly, even if a language model may be built for a given sentence from the same dependency tree, the language model is built differently according to the type of error. First, after receiving the target language corpus, dependencies in sentences contained in the target language corpus, i.e., a learning corpus, is analyzed to build a language model (step 200). Next, factors, to be described later, of respective words having dependency with a specific word are extracted to correct word errors for respective error types (word choice, word presence, word order) (step 202). The final language model is built by smoothing process based on frequency information about the words included in the extracted factors (step 204).

In order to build language models specified for respective error types, each word constituting a sentence may be defined as k factors. Here, a word w is composed of k factors $f^1$, $f^2, \ldots, f^k$, and may be represented by the following Equation (1).

$$w = \{f^1, f^2, \ldots, f^k\} = f^{1:k} \tag{1}$$

In this case, a probability that a word $w_i$ having dependency information $d_1, d_2, \ldots, d_{n-1}$, as context information is a correct word, that is, $P(w_i|d_1, d_2, \ldots, d_{n-1})$, is represented by the following Equation (2), $$P(w_i|(d_1, d_2, \ldots, d_{n-1})) = P(f_i^{1:k}|(f_{d1}^{1:k}, f_{d2}^{1:k}, \ldots, f_{dn-1}^{1:k})) \tag{2}$$

where $f_i^{1:k}$ denotes factors of $w_i$, and $f_{dj}^{1:k}$ denotes factors of a word $d_j$ having dependency with $w_i$.

In order to build a language model for the correction of word choice error, only basic forms of words are defined as factors, and the word w is defined by the following Equation (3).

$$w = \{f^1 = f', \text{basic form of word}\} \tag{3}$$

This is due to the assumption that, when w is a content word, it is possible to determine word choice error using only the basic form of related surrounding content words. Therefore, a language model for the correction of content word choice error is given by the following Equation (4).

$$P_{cw}(w_i|(d_1, d_2, \ldots, d_{n-1})) = P_{cw}(f_i^s|(f_{d1}^s, f_{d2}^s, \ldots, f_{dn-1}^s)) \tag{4}$$

That is, the language model is built by extracting the frequency information of content words under dependency of basic form from the dependency analyzed target language corpus.

For the correction of word presence error, if it is assumed that factors required by the language model is information about word sequences of all words under dependency, the building of the language model is performed by extracting word sequence information of all words under dependency with respect to a specific word from the dependency analyzed learning corpus. In a similar manner, the building of a language model for the correction of word order error is performed by extracting word sequence information of all words having dependency with the current target word.

Figure 3:
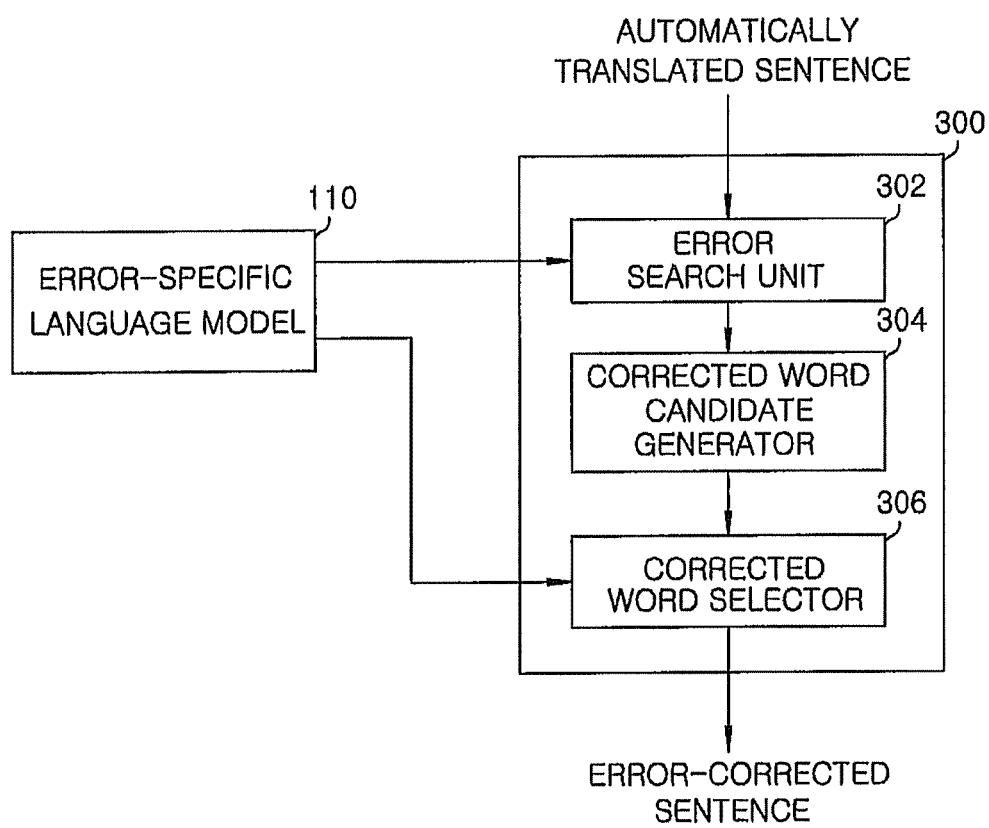
FIG. 3 is a block diagram showing the construction of a post-editing apparatus for correcting translation errors according to an embodiment of the present invention.

FIG. 3 is a block diagram showing the construction of a post-editing apparatus for correcting translation errors according to an embodiment of the present invention.

Referring to FIG. 3, a post-editing apparatus 300 for correcting translation errors includes an error search unit 302, a corrected word candidate generator 304, and a corrected word selector 306.

The error search unit 302 searches mistranslation from the translation result obtained using the machine translation system. At this time, the error search unit 302 searches or estimates the translation errors on the basis of the error-specific language model 110 generated by the error-specific language model builder 100, and determines correction orders therebetween.

Specifically, the error search unit 302, which is configured to correct word choice error and word presence error, estimates the probabilities of errors depending on probability models preset for respective errors and regards estimated errors as actual errors when the estimated error probabilities are equal to or less than a threshold value.

Further, after the error search unit 302 estimates the errors, it aligns the estimated errors by priorities according to correction sequences. The priorities are designated as follows.

1) Content words have higher correction priority than function words, and, among the content words, a word having a high probability of the occurrence of errors according to an error estimation model has higher correction priority.

2) Modifier has higher correction priority than modified, and among the modifiers, a word having a high probability of the occurrence of errors according to the error estimation model has higher correction priority.

3) Word choice error has higher correction priority than word order error.

The corrected word candidate generator 304 sequentially generates error-corrected word candidates according to priorities with respect to estimated translation errors when the estimation of errors has been performed by the error search unit 302 on the basis of information about an original text analyzed by the translation engine of the machine translation system.

Further, in order to generate error-corrected word candidates, other translation candidates are retrieved using results analyzed by the machine translation system, dictionary information, and so forth. In the case of word choice error, e.g., for English/Korean translation, information about other translated word candidates are retrieved based on the Korean dictionary information, thus generating the word candidates. In the case of word order error, error-corrected word candidates are generated by permuting the order of relevant words.

Moreover, after receiving the error-corrected word candidates generated by the corrected word candidate generator 304, the corrected word selector 306 calculates, for the generated candidates of the actual erroneous sentence, the probabilities based on the error-specific language model 110. A word having the highest probability exceeding a threshold among the calculated probabilities is selected as a corrected word.

Figure 4:
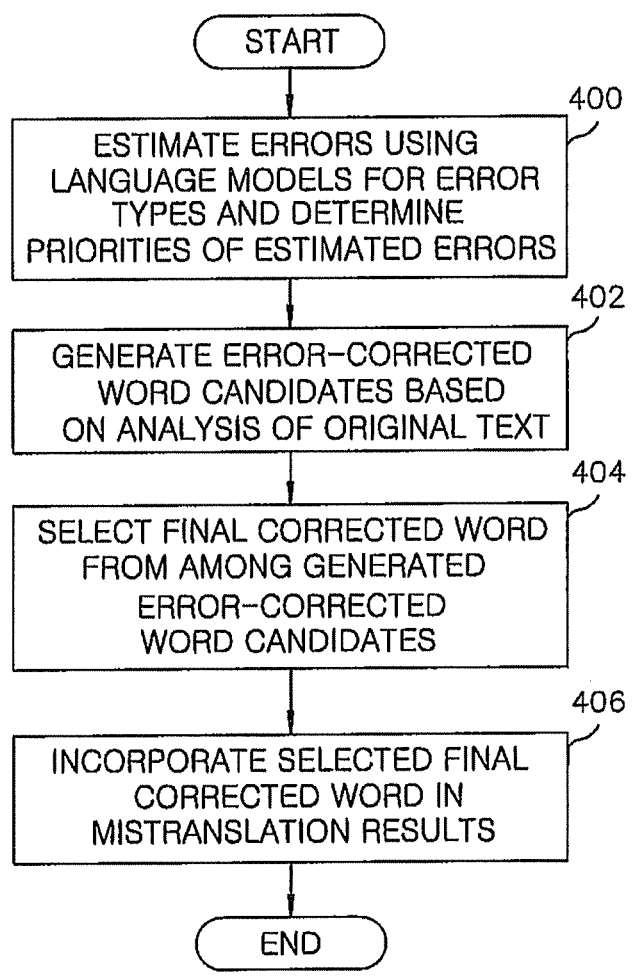
FIG. 4 is a flowchart showing the operating process of the post-editing apparatus for correcting translation errors according to an embodiment of the present invention.

FIG. 4 is a flowchart showing the operating process of a post-editing apparatus for correcting translation errors according to an embodiment of the present invention.

Referring to FIG. 4, translation errors are estimated by using the error-specific language model from the translation result of the translation system, and the estimated translation errors are aligned by priorities (step 400).

Next, after receiving the estimated translation errors aligned by the respective priorities, the corrected word candidates are sequentially generated in accordance with the priorities (step 402). At this time, other translation candidates may be retrieved using analysis of the translation system, dictionary information, and so forth.

A final corrected word is selected from among the error-corrected word candidates using the error-specific language model suitable for the type of error (step 404).

The errors are corrected by incorporating the selected final corrected word into the translation result data (step 406).

As described above, the embodiments of the present invention are intended to automatically detect errors in the final translation generated by the machine translation system and correct the errors to provide an accurate translation. Further, the embodiments are configured such that, after the machine translation system translates given data, a post-processing apparatus for correcting translation errors searches for a portion in which mistranslation has occurred, designates priorities for error correction in conformity with the characteristics of the found translation errors and sequentially corrects the translation errors according to the priorities by using language models specified for the types of translation errors, thus improving translation quality.

While the invention has been shown and described with respect to the preferred embodiments, it will be understood by those skilled in the art that various changes and modifications may be made without departing from the scope of the invention as defined in the following claims. Therefore, the scope of the present invention is not limited to the above-described embodiments and should be defined by the claims and equivalents thereof.

What is claimed is:

1. A post-editing apparatus for correcting translation errors, comprising:
    a translation error search unit for estimating translation errors using an error-specific language model suitable for a type of error desired to be corrected from translation result obtained using a translation system, and determining an order of correction of the translation errors;
    a corrected word candidate generator for sequentially generating error-corrected word candidates for respective estimated translation errors on a basis of analysis of an original text of the translation system; and
    a corrected word selector for selecting a final corrected word from among the error-corrected word candidates by using the error-specific language model suitable for the type of error desired to be corrected, and incorporating the final corrected word in the translation result, thus correcting the translation errors.

2. The post-editing apparatus of claim 1, wherein the error-specific language model is built from a target language corpus in a form specified for types of translation errors.

3. The post-editing apparatus of claim 2, wherein the error-specific language model is built in such a way that factors required for correction of errors for respective error types are separately defined for word choice error, word presence error, and word order error based on the corpus for which dependency was analyzed.

4. The post-editing apparatus of claim 3, wherein the word choice error is at least one of an error in selection of a translated word such as a noun, a verb, an adjective, an adverb, an article, a preposition, and an auxiliary verb, an error in singular/plural agreement, and an error in determining whether singular or plural.

5. The post-editing apparatus of claim 3, wherein the word order error is an error in an order of adjective sequence and an order in nominal compound.

6. The post-editing apparatus of claim 3, wherein the word presence error is an error related to presence of an article, a preposition and an auxiliary verb or adjective.

7. The post-editing apparatus of claim 1, wherein the translation error search unit sets priorities for correction of found translation errors in conformity with error correction priority determination rules.

8. The post-editing apparatus of claim 7, wherein the error correction priority determination rules are made in such a way that content words have higher correction priority than function words, modifier has higher correction priority than modified, and the word choice error has higher correction priority than word order error, and that, among the content words and among the modifiers, words having a high probability of errors have higher correction priority.

9. The post-editing apparatus of claim 7, wherein the corrected word candidate generator sequentially corrects the errors based on the error correction priorities set by the translation error search unit.

10. The post-editing apparatus of claim 1, wherein the corrected word selector calculates probabilities of sentences in which erroneous word in each erroneous sentence is replaced with relevant error-corrected word candidate by using the error-specific language model, and selects a word having a highest probability, from among the error-corrected word candidates, as a corrected word.

11. A post-editing method for correcting translation errors, comprising:
    estimating translation errors using an error-specific language model suitable for a type of error desired to be corrected from translation result obtained using a translation system;
    determining an order of correction of the translation errors;
    generating error-corrected word candidates, executed by a processing apparatus, for respective estimated translation errors on a basis of an analysis of original text by the translation system; and
    selecting a final corrected word from among the error-corrected word candidates using the error-specific language model suitable for the type of error desired to be corrected, and incorporating the final corrected word in the translation result, thus correcting the translation errors.

12. The post-editing method of claim 11, wherein the error-specific language model is built from a target language corpus in a form specified for types of translation errors.

13. The post-editing method of claim 12, wherein the error-specific language model is built in such a way that factors required for correction of errors for respective error types are separately defined for word choice error, word order error and word presence error, based on the corpus for which dependencies were analyzed.

14. The post-editing method of claim 13, wherein the word choice error is at least one of an error in selection of a translated word such as a noun, a verb, an adjective, an adverb, an article, a preposition, and an auxiliary verb, an error in singular/plural agreement, and an error in determining whether singular or plural.

15. The post-editing method of claim 13, wherein the word order error is an error in an order of adjective sequence and an order in nominal compound.

16. The post-editing method of claim 13, wherein the word presence error is an error related to presence of an article, a preposition and an auxiliary verb or adjective.

17. The post-editing method of claim 11, wherein the estimating errors is performed to set priorities for correction of found translation errors in conformity with error correction priority determination rules.

18. The post-editing method of claim 17, wherein the error correction priority determination rules are made in such a way that content words have higher correction priority than function words, modifier has higher correction priority than modified, and the word choice error has higher correction priority than word order error, and that, among the content words and among the modifiers, words having a high probability of errors have higher correction priority.

19. The post-editing method of claim 17, wherein said generating the error-corrected word candidates is performed to sequentially correct the errors based on the set error correction priorities.

20. The post-editing method of claim 11, wherein said correcting the errors includes:
   calculating probabilities of sentences in which an erroneous word in each erroneous sentence is replaced with relevant error-corrected word candidate by using the error-specific language model; and
   selecting a word having a highest probability, from among the corrected word candidates, as a corrected word.

* * * * *